United States Patent
Kim et al.

(10) Patent No.: US 12,427,461 B2
(45) Date of Patent: Sep. 30, 2025

(54) APPARATUS AND METHOD FOR CLEANING METAL FILTER

(71) Applicant: LG Chem, Ltd., Seoul (KR)

(72) Inventors: Hyun Uk Kim, Daejeon (KR); Sang Soo Jang, Daejeon (KR); Young Su Park, Daejeon (KR); Seong Bae Kim, Daejeon (KR); Yi Rang Lim, Daejeon (KR); Kyoung Wan Park, Daejeon (KR); Eun Hee Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 18/766,057

(22) Filed: Jul. 8, 2024

(65) Prior Publication Data

US 2024/0359120 A1    Oct. 31, 2024

Related U.S. Application Data

(62) Division of application No. 17/281,754, filed as application No. PCT/KR2019/011892 on Sep. 11, 2019, now Pat. No. 12,064,720.

(51) Int. Cl.
*B01D 41/04* (2006.01)
*B01D 29/15* (2006.01)
(Continued)

(52) U.S. Cl.
CPC ............ *B01D 41/04* (2013.01); *B01D 29/15* (2013.01); *B01D 29/68* (2013.01); *B01D 39/10* (2013.01); *B01D 2201/087* (2013.01)

(58) Field of Classification Search
None
See application file for complete search history.

(56) References Cited

U.S. PATENT DOCUMENTS

| | | |
|---|---|---|
| 3,606,897 A | 9/1971 | Tobin et al. |
| 4,967,776 A | 11/1990 | Folmar |

(Continued)

FOREIGN PATENT DOCUMENTS

| | | |
|---|---|---|
| CN | 202161858 U | 3/2012 |
| CN | 102920395 A | 2/2013 |

(Continued)

OTHER PUBLICATIONS

KR 101033143 B1 machine translation, Metal Filter Cleaning Equipment and Cleaning Method of It, Kim (Year: 2011).*

(Continued)

*Primary Examiner* — Cristi J Tate-Sims
(74) *Attorney, Agent, or Firm* — Lerner David LLP

(57) ABSTRACT

An apparatus for cleaning a metal filter comprises a cleaning bath having a predetermined size and connected to a cleaning solution tank, a jig which is vertically elevatable and horizontally slidable in the cleaning bath and to which the metal filter is fixed, a nozzle mounted so that a discharge hole thereof is faced upward in the cleaning bath, and a controller which controls supply and blocking of a cleaning solution from the cleaning solution tank to the cleaning bath, controls supply and blocking of compressed air or the water to the nozzle, controls movement of the jig, and controls filling or discharging of the water into/from the cleaning bath. The controller controls the movement of the jig and selectively controls the supply and blocking of the water, the cleaning solution, and the compressed air, and the draining of the cleaning bath according to predetermined logic.

6 Claims, 7 Drawing Sheets

(51) Int. Cl.
  *B01D 29/68* (2006.01)
  *B01D 39/10* (2006.01)

(56) References Cited

U.S. PATENT DOCUMENTS

| | | |
|---|---|---|
| 5,589,080 A | 12/1996 | Cho et al. |
| 6,149,716 A | 11/2000 | Bach et al. |
| 2009/0291157 A1 | 11/2009 | Consoli et al. |
| 2010/0101737 A1 | 4/2010 | Kiekens et al. |
| 2013/0056035 A1* | 3/2013 | Kraai ................. B01D 50/20 134/25.1 |

FOREIGN PATENT DOCUMENTS

| | | |
|---|---|---|
| CN | 108330286 A | 7/2018 |
| CN | 108421310 A | 8/2018 |
| JP | H05049902 A | 3/1993 |
| JP | H10043532 A | 2/1998 |
| JP | 2002095906 A | 4/2002 |
| JP | 2004156500 A | 6/2004 |
| JP | 2004261324 A | 9/2004 |
| JP | 2008535661 A | 9/2008 |
| JP | 2010521281 A | 6/2010 |
| KR | 200298749 Y1 | 12/2002 |
| KR | 100773757 B1 | 11/2007 |
| KR | 100926091 B1 | 11/2009 |
| KR | 101033143 B1 | 5/2011 |
| KR | 101360225 B1 | 2/2014 |
| KR | 20150093375 A | 8/2015 |
| KR | 101595228 B1 | 2/2016 |
| KR | 20160142469 A | 12/2016 |
| KR | 20170031348 A | 3/2017 |
| KR | 20200029272 A | 3/2020 |

OTHER PUBLICATIONS

International Search Report for Application No. PCT/KR2019/011892, Dated Jun. 12, 2020, 2 pages.
Extended European Search Report for EP Application No. 19945080.0 dated Sep. 21, 2021, 3pgs.
Search Report dated Jan. 7, 2022 from the Office Action for Chinese Application No. 201980062277.8 issued Jan. 17, 2022, 3pgs.

* cited by examiner (c)

(d)

(b)

APPARATUS AND METHOD FOR CLEANING METAL FILTER

CROSS-REFERENCE TO RELATED APPLICATIONS

The present application is a divisional of U.S. patent application Ser. No. 17/281,754, filed on Mar. 31, 2021, which is a national phase entry under 35 U.S.C. § 371 of International Application No. PCT/KR2019/011892, filed on Sep. 11, 2019, published in Korean, the disclosures of which are hereby incorporated by reference herein.

TECHNICAL FIELD

The present invention relates to an apparatus and method for cleaning a metal filter, and more particularly, to an apparatus and method for cleaning a metal filter, in which cleaning, rinsing, and drying are performed in one cleaning bath to achieve a high space utilization, a reduction in cleaning time, and an increase in cleaning efficiency when compared to cleaning methods according to the related art.

BACKGROUND ART

A positive electrode active material for a secondary battery is manufactured by mixing a lithium raw material with a precursor, and the precursor is generally manufactured through a precipitation method in which precipitation is performed in a solid state within a chemical reactor. The precursor is precipitated by a coprecipitation reaction with a metal-mixed solution, caustic soda, ammonia, or the like. Here, liquid-phase materials pass through a filter. As a result, only reactants (precursors) remain in a chemical reaction bath, and filtered liquids (liquids other than the reactants) are discharged to the outside of the chemical reaction bath.

Various types of filters are used, but metal filters are used in a large-scale production facility due to durability against high temperature and high pressure, an economic feasibility, or the like.

The metal filters may be classified into a mesh filter in which steel wires are fabricated to form a mesh (a wire net) pattern, a metal fiber filter which comprises an outer shell having a shape of the mesh filter and an inner shell inserted into the outer shell and having through-holes that are more closely spaced and have smaller diameters than those of the outer shell, and a metal sintered filter manufactured in a pipe shape by sintering metal powder under high temperature and high pressure.

The metal filter is used in a manner in which large-sized foreign substances contained in a liquid are filtered, that is, the liquid is allowed to pass through the through-holes, but the foreign substances are not allowed to pass through the through-holes but filtered. Thus, in the state in which the foreign substances are filtered by the through-holes, the liquid is increasingly difficult to pass. Therefore, periodic cleaning is required.

The metal filter used during the process of manufacturing the precursor is cleaned by using an ultrasonic cleaning method. In the ultrasonic cleaning method, NaOH-added cleaning solution is put into an ultrasonic cleaner, the used metal filter is immersed in the cleaning solution for about 1 hour to about 3 hours, and then ultrasonic waves are applied to the metal filter to perform cleaning. After the ultrasonic cleaning, the metal filter moves to a rinsing bath, into which portable water is sprayed, so as to be rinsed and dried, thereby completing the cleaning.

DISCLOSURE OF THE INVENTION

Technical Problem

A main objective of the present invention is to provide an apparatus and method for cleaning a metal filter, in which reduction in installation area, improvement in cleaning efficiency, and shortening of cleaning time are achieved when compared to the ultrasonic cleaning method according to the related art.

Technical Solution

To achieve the above-described objects, the present invention is to provide a method for cleaning a metal filter which has a cylindrical shape, in which an opening is provided in one side thereof, and has a through-hole in a side surface thereof so that when a fluid containing foreign substances is introduced into the opening, the foreign substances are filtered by the through-hole, and only the fluid is discharged through the through-hole. The cleaning method according to the present invention comprises: a step of mounting the metal filter on a jig that is vertically elevatable and horizontally slidable in a cleaning bath so that the opening is faced downward; a step of allowing the jig to descend so that a nozzle installed in the cleaning bath enters the opening; a step of injecting a predetermined amount of water and a cleaning solution into the cleaning bath so that the metal filter is immersed; a step of spraying compressed air through the nozzle to discharge bubbles toward an inner surface of the metal filter; a step of draining the cleaning bath; a step of spraying water through the nozzle to remove the cleaning solution; and a step of spraying the compressed air through the nozzle to dry the metal filter.

The nozzle is installed to be divided into an air nozzle through which the compressed air is sprayed and a water nozzle through which the water is sprayed in the cleaning bath, wherein the jig is elevated or descended, and slid to allow the air nozzle or the water nozzle to enter the opening from a lower side of the metal filter before spraying the compressed air or the water.

The foreign substances filtered by the metal filter is metal oxide, and the cleaning solution and the water are mixed with each other to obtain a pH concentration ranging from 1 to 2.

When the metal filter is dried, the compressed air may be sprayed in a state of being heated at 100° C. to 150° C.

When the compressed air or the water is sprayed onto the inner surface of the metal filter, the jig may be repeatedly elevated and descended, and the metal filter may selectively or simultaneously rotate in an axial direction.

The metal filter cleaned in an embodiment according to the present invention comprises an outer shell having a pipe shape and a plurality of through-holes and an inner shell inserted into an inner circumferential surface of the outer shell and having a pipe shape, the inner shell having through-holes each of which has a size less than that of the outer shell.

Also, the present invention additionally provides an apparatus for cleaning a metal filter as another embodiment. The cleaning apparatus according to the present invention comprises: a cleaning bath having a predetermined size and connected to a cleaning solution tank; a jig which is vertically elevatable and horizontally slidable in the cleaning bath and to which the metal filter is fixed; a nozzle mounted so that a discharge hole thereof is faced upward in the cleaning bath, the nozzle spraying compressed air or water, which is supplied from the outside, into the cleaning bath; and a controller which controls supply and blocking of a cleaning solution from the cleaning solution tank to the cleaning bath, controls supply and blocking of the compressed air or the water to the nozzle, controls movement of the jig, and controls filling or discharging of the water into/from the cleaning bath, wherein, in a state in which the metal filter is mounted on the jig so that an opening of the metal filter is faced downward, the controller controls the movement of the jig so that the nozzle enters the metal filter through the opening and selectively controls the supply and blocking of the water, the cleaning solution, and the compressed air, and the draining of the cleaning bath according to predetermined logic to sequentially perform cleaning and drying of the metal filter within the cleaning bath.

The nozzle comprises an air nozzle through which the compressed air is sprayed and a water nozzle which is installed to be spaced apart from the air nozzle and through which the water is sprayed.

The air nozzle is connected to an air tank in which the compressed air is stored, and the water nozzle is connected to a water tank in which the water is stored, wherein a valve installed between the air nozzle and the air tank and a valve installed between the water nozzle and the water tank are controlled to be opened and closed by the controller.

The air nozzle generates bubbles under the water when spraying the compressed air in a state in which the cleaning bath is filled with the water, wherein the bubbles are sprayed so that a point at which the bubbles contact an inner surface of the metal filter is higher than that at which the bubbles are generated by the air nozzle.

In a state in which the nozzle enters the metal filter, the metal filter may rotate by rotation of a gripper that is coupled to an upper end of the metal filter.

Also, the cleaning bath has a shape having an opened upper side and is opened and closed by a cover that covers the upper side, and the cleaning bath comprises a release valve that discharges air or a liquid when an internal pressure increases due to the performance of the cleaning under the state in which the cleaning bath is closed by the cover.

Advantageous Effects

The present invention comprising the above-described constituents may have the effect in which the installation space is reduced, and the amount of the water to be consumed decreases, because the water, the cleaning solution, and the compressed air are automatically supplied and discharged according to the predetermined logic to sequentially perform the cleaning and drying of the metal filter within the one cleaning bath.

According to the present invention, since the air nozzle generates the bubbles under the water when spraying the compressed air in the state in which the cleaning bath is filled with the water, the cleaning effect may be enhanced due to the bubbles.

Also, since the metal filter is selectively elevated or rotates when cleaned or dried, the water and foreign substances may be shaken off by the centrifugal force and/or the inertia, and thus the cleaning and drying efficiency may be more enhanced.

Furthermore, since the cleaning is performed while the cleaning bath is closed by the cover, the water may be prevented from escaping outward. The internal pressure rising as the compressed air is injected may be released by the release valve 11.

MODE FOR CARRYING OUT THE INVENTION

Hereinafter, the present invention will be described in detail with reference to the accompanying drawings so that the present invention can be easily carried out by a person skill in the art to which the present invention pertains. The present invention may, however, be embodied in different forms, and not be limited to the embodiments set forth herein.

A part unrelated to the description will be omitted so as to clearly describe the present invention, and like reference symbols denote like elements throughout the specification.

Terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

The present invention provide an apparatus for cleaning a metal filter as Embodiment 1 and a method for cleaning the metal filter as Embodiment 2, wherein the metal filter has a cylindrical shape, in which an opening is provided in one side end thereof (an upper end or a lower end), and has a through-hole disposed in a side surface thereof (an outer circumferential surface) for communicating with the inside and outside so that when a fluid containing foreign substances is introduced into the opening, the foreign substances are filtered by an inner wall surface, and only the fluid is discharged through the through-hole. Hereinafter, embodiments of the present invention will be described in more detail with reference to the accompanying drawings.

Embodiment 1

Figure 1:
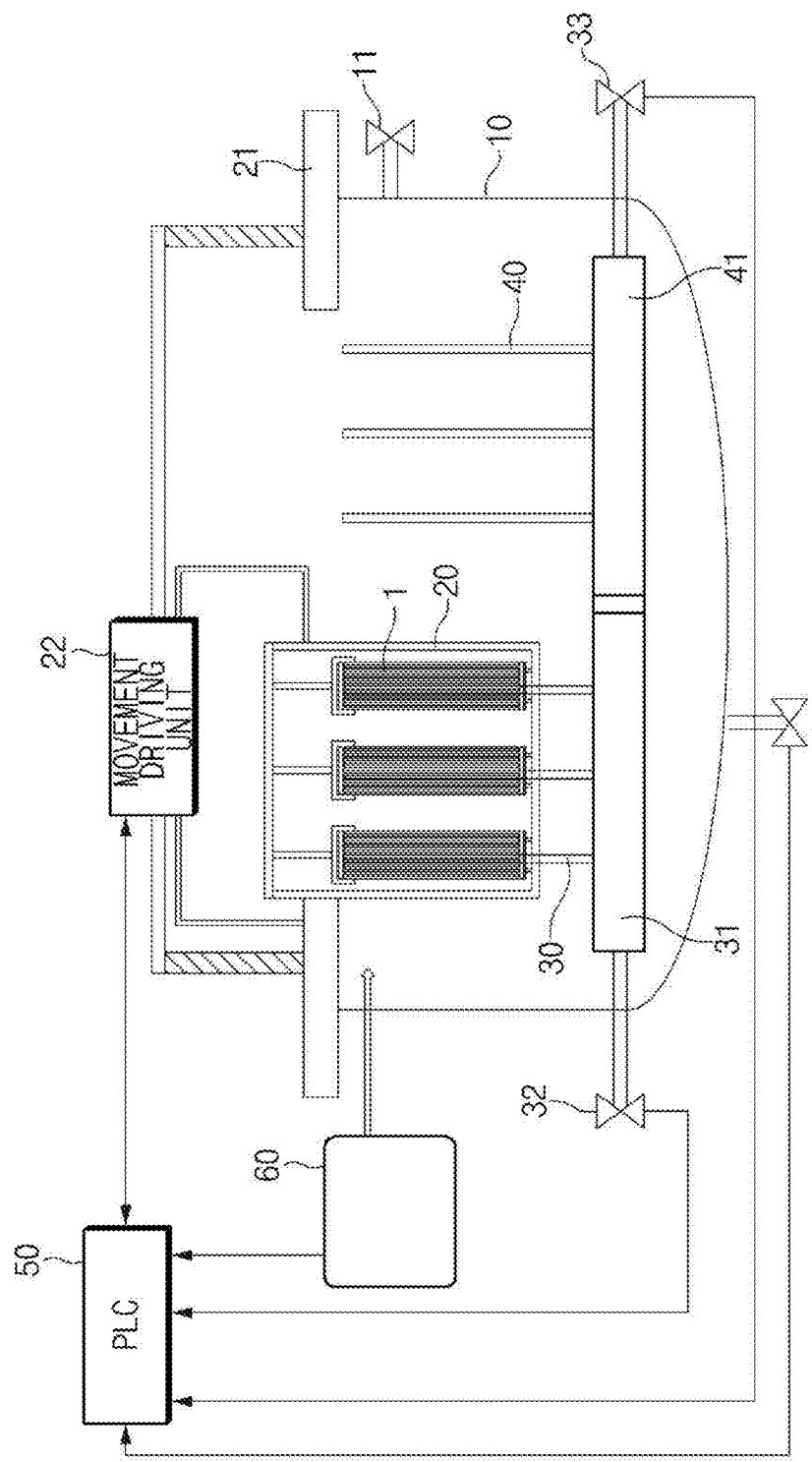
FIG. 1 is a schematic view illustrating an overall configuration of a cleaning apparatus according to an embodiment of the present invention.

The present invention provides an apparatus for cleaning a metal filter as Embodiment 1. FIG. 1 is a schematic view illustrating entire components of a cleaning apparatus according to an embodiment of the present invention. Referring to FIG. 1, the cleaning apparatus according to the present invention comprises one cleaning bath 10, a jig 20 that is elevatable and horizontally slidable, nozzles comprising an air nozzle 30 and an water nozzle 40, and a controller 50 that controls operations of the nozzle and the jig 20.

The cleaning bath 10 has a predetermined size and is connected to a cleaning solution tank 60 disposed outside to allow the cleaning solution to be selectively introduced to the inside. An opened upper portion of the cleaning bath 10 may be closed by a cover 21 to close the inside. The cleaning bath 10 is also connected to an air tank 31 storing compressed air and a water tank 41 storing water as well as the cleaning solution tank 60, and inflow and discharge are controlled by valves 32 and 33 that are controlled to be opened and closed by a controller 50.

The jig 20 may be vertically elevated and horizontally slid, preferably, movably coupled to the cover 21. For example, an exclusive rail, a sliding groove, or the like on which the jig is slidable may be provided on/in the cover 21, and the jig 20 may be slid by a movement driving unit 22 that is operated by a hydraulic pressure or force of a motor. Alternatively, while the jig 20 is fixed on the exclusive rail or the sliding groove, only a portion of the jig 20 on which a metal filter 1 is mounted may be elevated.

A plurality of metal filters 1 may be mounted on the jig 20 at the same time, and the nozzles 30 and 40 may enter from a lower side of the jig 20 to spray the compressed air and the water. Also, a gripper 23 into which an upper end of the metal filter 1 is inserted or fixed is disposed inside the jig 20, and the gripper 23 may selectively rotate while fixing the upper end of the metal filter 1.

Each of the nozzles 30 and 40 is mounted inside the cleaning bath 10, but a discharge hole of each nozzle is faced upward (or although a portion of the nozzle is positioned outside the cleaning bath, at least the discharge hole is mounted inside the cleaning bath so as to be faced upward) so that the compressed air or the water, which is supplied from the outside, are sprayed into the cleaning bath 10 from a lower side toward an upper side.

The nozzle comprises the air nozzle 30 through which the compressed air is sprayed and the water nozzle 40 which is installed to be spaced apart from the air nozzle 30 and through which the water is sprayed. The air nozzle 30 is connected to the air tank 31 in which the compressed air is stored, and the water nozzle 40 is connected to the water tank 41 in which the water is stored. The valve 32 installed on a path through which the compressed air is supplied and the valve 33 installed on a path through which the water is supplied are controlled to be opened and closed by the controller 50.

Figure 2:
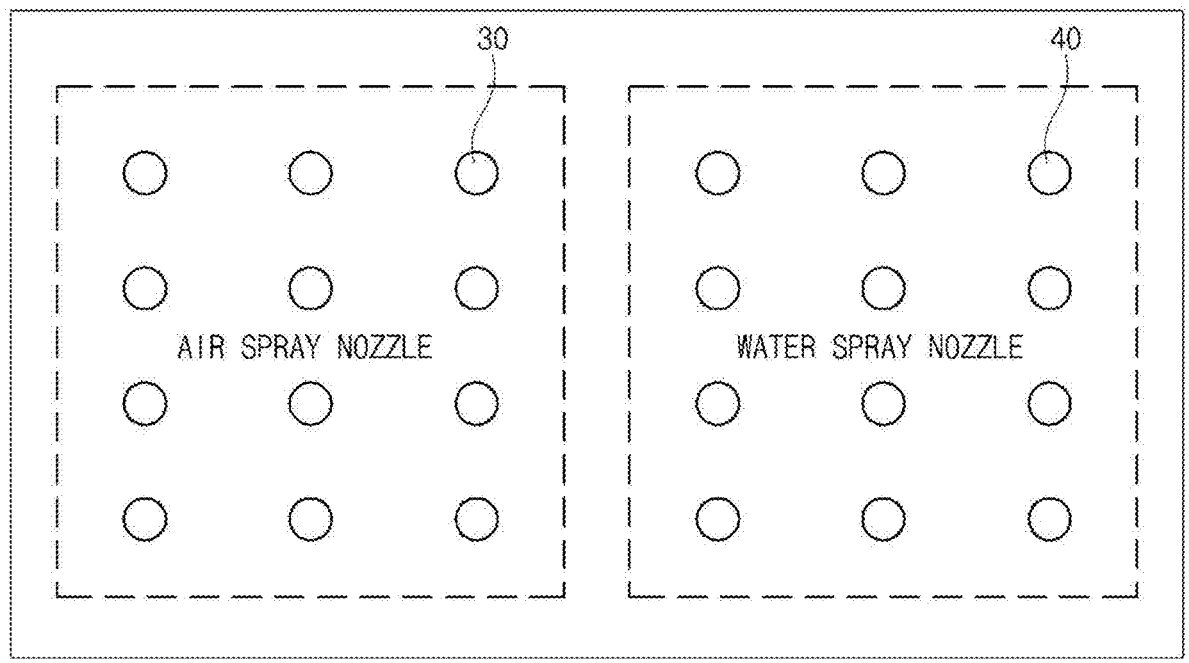
FIG. 2 is a plan view of an air nozzle and a water nozzle installed in a cleaning bath.

Although FIGS. 1 and 2 illustrate the structure in which the air nozzle 30 and the water nozzle 40 are installed spaced apart from each other, the water nozzle 40 and the air nozzle 30 may be integrated with each other if a distribution pipe (not shown) that selectively distributes the water and the compressed air is added. That is, in a state in which an inlet side of the distribution pipe is connected to each of the water tank 41 and the air tank 31, and an outlet side of the distribution pipe connected to each of the air nozzle 30 and the water nozzle 40, the compressed air or the water may be selectively sprayed from a nozzle on the inlet side when the inlet side of the distribution pipe is controlled.

When the compressed air or the water is selectively sprayed from the nozzle as described above, a size of the cleaning bath 10 may be reduced, and a cleaning time may be shortened (because the movement of the jig may be shortened). However, since an allowable pressure for spraying the water and the compressed air may be reduced when compared to a configuration in which the air nozzle 30 and the water nozzle 40 are independently installed, whether to separate the air nozzle 30 and the water nozzle 40 as illustrated in FIG. 2 or to integrate the nozzles may be selected according to requested design specifications.

Figure 3:
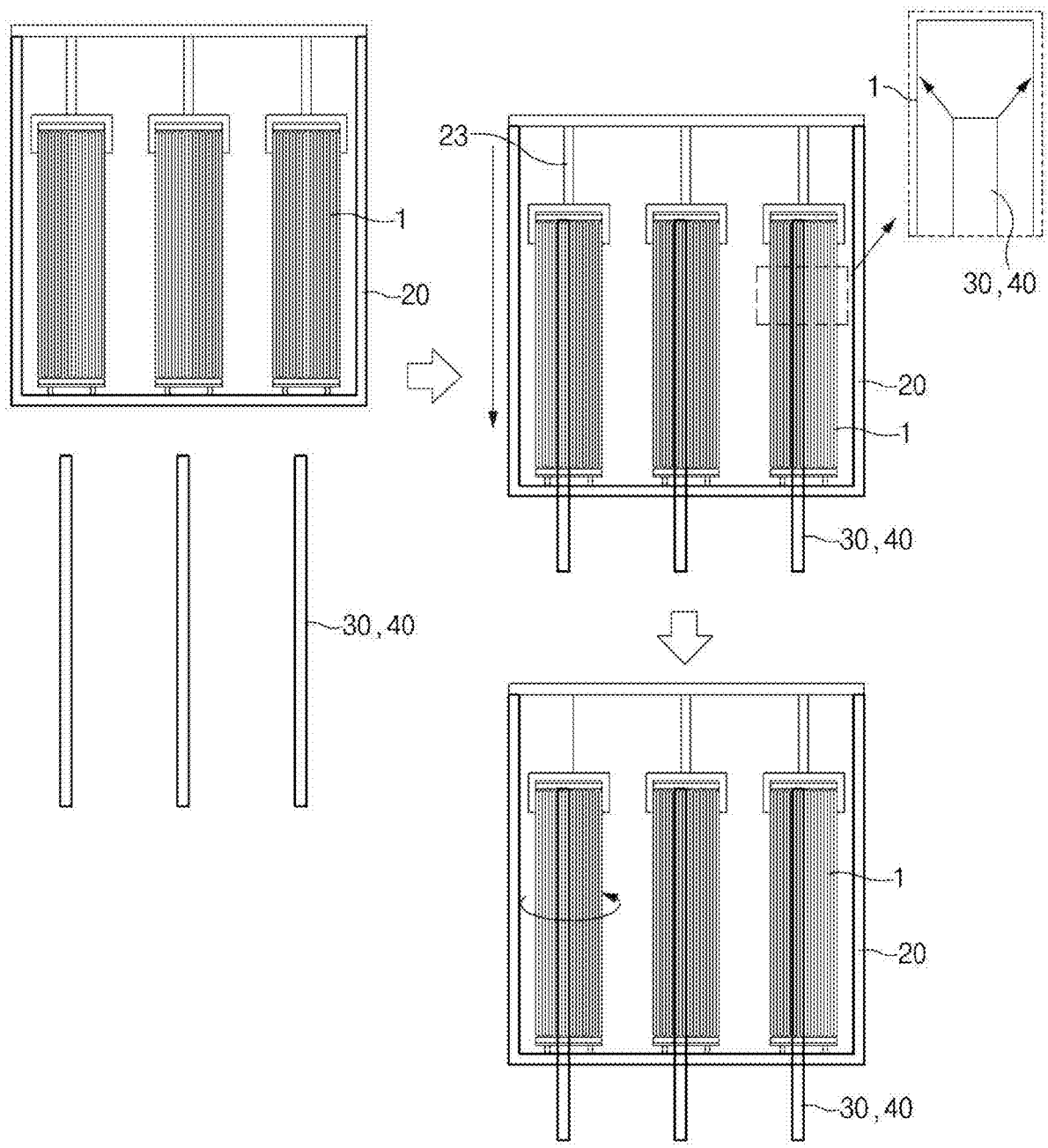
FIG. 3 is a front view illustrating a state in which a nozzle (an air nozzle and a water nozzle) is inserted into a metal filter mounted on a jig in a cleaning bath and a state in which the metal filters rotate.

Furthermore, in order to easily separate foreign substances attached on an inner circumferential surface of the metal filter 1, each of the air nozzle 30 and the water nozzle 40 sprays the compressed air and the water from the lower side toward the upper side. That is, as illustrated in FIG. 3, a spray hole which is provided in the upper end of each of the nozzles 30 and 40 and through which the water or the compressed air is sprayed is configured so that a height of a point at which the sprayed compressed air or the sprayed water contacts the inner circumferential surface of the metal filter 1 is higher than that at which the spraying starts. Accordingly, when the air nozzle 30 sprays the compressed air in a state in which the cleaning bath 10 is filled with the water, bubbles are generated under the water. Here, the bubbles are sprayed so that a point at which the bubbles contact an inner surface of the metal filter 1 is higher than that at which the bubble are generated in the air nozzle 30 (see arrows in FIG. 3).

Also, as described above, the cleaning bath 10 has a shape having an opened upper side and is opened and closed by a cover 21 that covers the upper side thereof. The cover 21 may have a size that is enough to cover the entire upper side of the cleaning bath 10, and a seal ring is preferably provided on a portion of the cover 21, which contacts the cleaning bath 10, so as to prevent leakage. Thus, when the cleaning is performed in the state in which the cover 21 is closed, the internal pressure rises if the compressed air or the water is supplied into the cleaning bath 10.

Here, in order to reduce the internal pressure, a release valve 11 for discharging air or a liquid when the internal pressure rises to a predetermined level or more may be mounted in the cleaning bath 10. The release valve 11 may be controlled to be opened and closed by the controller 50 or may be automatically opened and closed in response to the internal pressure irrespective of the control valve 50.

The controller 50 according to the present invention controls an operation of the cleaning apparatus by controlling the movement of the jig 20 and all controllable valves, which are installed in the cleaning apparatus, such as a valve that is installed in a pipe for connecting the cleaning solution tank 60 to the cleaning bath 10, the valve 32 that is installed in a pipe connected to the air nozzle, and the valve 33 that is installed in a pipe connected to the water nozzle. That is, the controller 50 controls supply and blocking of the cleaning solution from the cleaning solution tank 60 to the cleaning bath 10, controls supply and blocking of the compressed air or the water to the nozzles 30 and 40, controls the movement of the jig 20, and controls filling or discharging of the water into/from the cleaning bath 10. Although the well-known controllers or control methods are selectively employed as the controller 50, a programmable logic controller (PLC) programed to control an operation of each of components according to predetermined logic may be preferably selected. The valves 32 and 33 described above may be preferably constituted by a solenoid valve that is controlled to be opened and closed by an electric signal.

In the cleaning apparatus comprising the above-described constituents according to the present invention, in the state in which the metal filter 1 is mounted on the jig 20 so that an opening of the metal filter is faced downward, the controller 50 controls the movement of the jig 20 so that each of the nozzles 30 and 40 enters the metal filter 1 through the opening and selectively controls the supply and blocking of the water, the cleaning solution, and the compressed air, and the draining of the cleaning bath 10 according to the predetermined logic to sequentially perform the cleaning and drying of the metal filter 1 within the cleaning bath 10.

Embodiment 2

Figure 4:
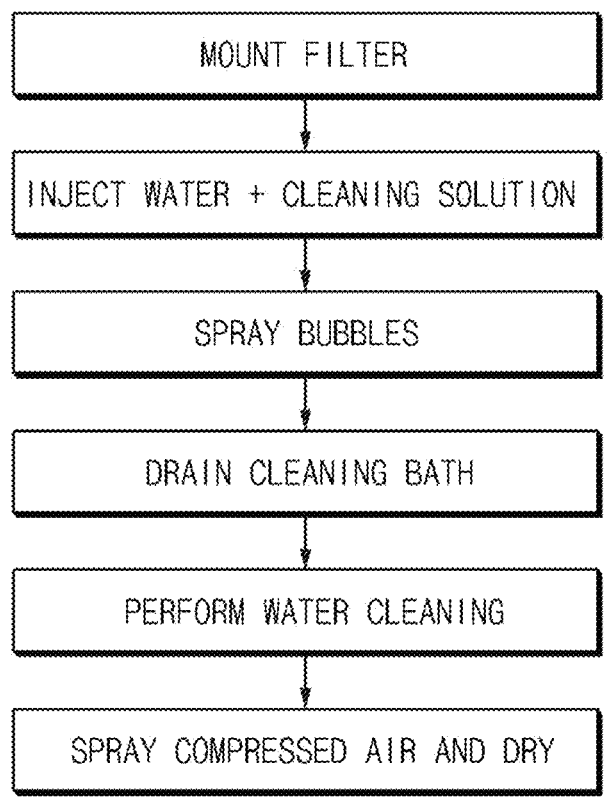
FIG. 4 is a flow chart of a cleaning method according to an embodiment of the present invention.

The present invention provides an apparatus for cleaning a metal filter as Embodiment 2. A cleaning method according to the present invention is carried out according to the order illustrated in FIG. 4.

In a filter mounting step, the metal filter 1 is mounted on a jig 20 that is vertically elevatable and horizontally slidable in a cleaning bath 10. Here, the metal filter 1 is mounted so that an opening thereof is faced downward, and the jig 20 has a hole that is punched in a region thereof corresponding to a position of the opening so that each of nozzles 30 and 40 enters from a lower side.

As illustrated in FIG. 3 in a state in which the metal filter 1 is mounted, the jig 20 descends so that each of the nozzles 30 and 40 installed in the cleaning bath 10 enters the opening. Here, a nozzle that firstly enters when the metal filter 1 descends refers to as an air nozzle 30.

In a state in which the air nozzle 30 enters the metal filter 1, a predetermined amount of water and cleaning solution are injected into the cleaning bath 10 so that the metal filter 1 is immersed. The water is supplied through the water nozzle 40 (or through a separate water supply pipe), and the cleaning solution is supplied from the cleaning solution tank 60. Here, most foreign substances, which are attached to the inside of the metal filter 1 used to manufacture a precursor of a secondary battery, are metal oxides. Thus, each of the cleaning solution and the water has a pH concentration ranging from 1 to 2 so that the metal oxides are easily dissolved. That is, cleaning efficiency may be deteriorated when the pH concentration is greater than 2, and a chemical change may occur when less than 2. Thus, an appropriate amount of cleaning solution and water is supplied to obtain the pH concentration ranging from 1 to 2.

Also, when the metal filter 1 is immersed in the water and the cleaning solution, the air nozzle 30 sprays compressed air toward an inner surface of the metal filter 1. As a result, bubbles are generated in the liquid by the compressed air, and the bubbles collide with an inner wall surface of the metal filter 1. The bubbles separate the adsorbed foreign substances from the inner wall surface of the metal filter 1 to improve a cleaning effect.

Furthermore, as described above, a spray hole of the air nozzle 30, through which the compressed air is sprayed, is provided so that a height of a position at which the sprayed bubbles contact an inner circumferential surface of the metal filter 1 is higher than that at which the spraying starts (see the enlarged portion in FIG. 3). With such a structure, the foreign substances separated by the bubbles fall down due to gravity and are discharged downward from the opening of the metal filter 1. However, the bubbles may hit only a specific portion of the metal filter 1. According to the present invention for solving this problem, the jig 20 may be repeatedly elevated when the compressed air is sprayed on the inner surface of the metal filter 1. Also, when the jig 20 is elevated or when stopped after the elevation, a gripper 23 that grips an upper end of the metal filter 1 may rotate to allow the metal filter 1 to axially rotate. Both an upper portion and a lower portion of the inner wall surface of the metal filter 1 may be hit by the bubbles due to the elevation of the jig 20 and may be hit by the bubbles along all circumferences due to the rotation of the gripper 23 irrespective of the position of the spray hole of the air nozzle 30. In addition, it may also be expected that the foreign substances attached on the outer circumferential surface of the metal filter 1 are separated due to centrifugal force while the metal filter 1 rotates. The elevation of the jig 20 and the rotation of the gripper 23 may be performed in the same manner when the water nozzle 40 enters to spray the water (to the inner wall surface of the metal filter) as well as when the air nozzle 30 enters the metal filter 1.

When the spraying of the bubbles is completed, the water and cleaning solution stored in the cleaning bath 10 are discharged. During the draining of the cleaning bath 10 or after the draining of the cleaning bath, the jig 20 ascends to be separated from the air nozzle 30 and then moves to the water nozzle 40. Subsequently, the jig 20 descends as illustrated in FIG. 3 so that the water nozzle 40 enters the metal filter 1.

In a state in which the draining of the cleaning solution and the water is completed, and the water nozzle 40 enters the metal filter 1, the water nozzle 40 sprays water to wash (rinse) the cleaning solution, foreign substance residues, or the like, which remain on the surface of the metal filter 1. Here, in order to entirely wash the inner wall surface of the metal filter 1, the elevation of the jig 20 and the rotation of the gripper 23 may be selectively performed. An outer circumferential surface of the metal filter 1 may be washed by water that rises in the cleaning bath 10, and while the cleaning bath 10 is being filled, the compressed air may be selectively sprayed from the air nozzle 30 to generate a vortex flow in the water stored in the cleaning bath 10. The vortex flow may generate a flow of the stored water to more improve rinsing efficiency of the metal filter 1.

Also, since the metal filter 1 has a structure in which the foreign substances are filtered by the through-hole when a liquid is introduced through the opening, the foreign substances are attached to the inner wall surface, but are not likely to be attached to the outer circumferential surface. In this case (the outer circumferential surface is clean), since it is unnecessary to clean the outer circumferential surface of the metal filter 1, the cleaning bath 10 is drained so as not to be filled with water when the water nozzle 40 sprays the water. In this case, the step for draining the cleaning bath 10 may be omitted to reduce a cleaning time.

When the water cleaning is completed, the jig 20 ascends again and moves and then descends so that the air nozzle 30 enters the metal filter 1. In the state in which the descending is completed, the compressed air is sprayed from the air nozzle 30 to dry the metal filter 1. The compressed air supplied when the metal filter 1 is dried may be sprayed in a state of being heated at 100° C. to 150° C.

The compressed air may be heated inside an air tank 31 or heated while passing through a path of a pipe connected to the air tank 31 and is sprayed in a dried condition in which moisture are eliminated as much as possible. Even when the drying is performed, the jig 20 may be selectively elevated, and the gripper 23 may rotate.

When the drying is completed, the jig 20 returns to the original position (the position when the metal filter is mounted), and the metal filter 1 is separated.

For reference, the jig 20 may be mounted to be slid and elevated on the cover 21, and the gripper 23 may be mounted to be rotatable. The jig 20 may be only slid on the cover 21 and elevated by elevation of the cover 21. Also, the gripper 23 is illustrated as being mounted on an upper end of the metal filter 1, but may also be mounted on a lower end of the metal filter 1.

In addition, the metal filter 1 cleaned according to an embodiment of the present invention may be a metal fiber filter comprising an outer shell β having a pipe shape and a mesh structure with a plurality of through-holes in a lattice pattern and an inner shell α inserted into an inner circumferential surface of the outer shell β and having a pipe shape and a thread bundle shape with through-holes smaller than those of the outer shell. In the metal fiber filter, the outer shell functions as a support for supporting the inner shell, and a particle size to be filtered of foreign substances is determined according to a size of each of the through-holes of the inner shell. For example, the more the through-hole of the inner shell decreases in size, the more particles to be filtered decreases in size. However, on the contrary, an amount of foreign substances to be filtered may increase.

Experimental Example 1

Comparison of Cleaning States Between Ultrasonic Cleaning and the Cleaning According to Embodiment 2 of the Present Invention Ultrasonic Cleaning (Comparative Example 1)

Water, to which a predetermined amount of sodium hydroxide-based cleaning solution is added, was put into an ultrasonic cleaner, and a metal filter, to which foreign substances are attached, was immersed in the water. Then, the filter was cleaned for three hours (an ultrasonic frequency is 40 kHz). Subsequently, the metal filter was taken out of the ultrasonic cleaner, rinsed by spraying the water for one hour, and then dried.

Cleaning According to Embodiment 2 of the Present Invention

Bubbles were sprayed in a state in which a metal filter is immersed in a mixed solution in which water and a cleaning solution with a hydrogen chloride (HCl) component are mixed at an appropriate concentration (HCl of 0.05 mole/L to 0.1 mole/L). Here, the metal filter prior to cleaning is in a state in which foreign substances are attached therein, as almost the same degree as in the metal filter used in the ultrasonic cleaning. A temperature of the mixed solution is 50° C., and pH is 1.0 to 2.0. After the cleaning solution was discharged from a cleaning bath, the metal filter was rinsed with water and dried in the same manner as the method described above. Here, a temperature of compressed air applied when dried is 100° C. to 150° C.

Figure 5:
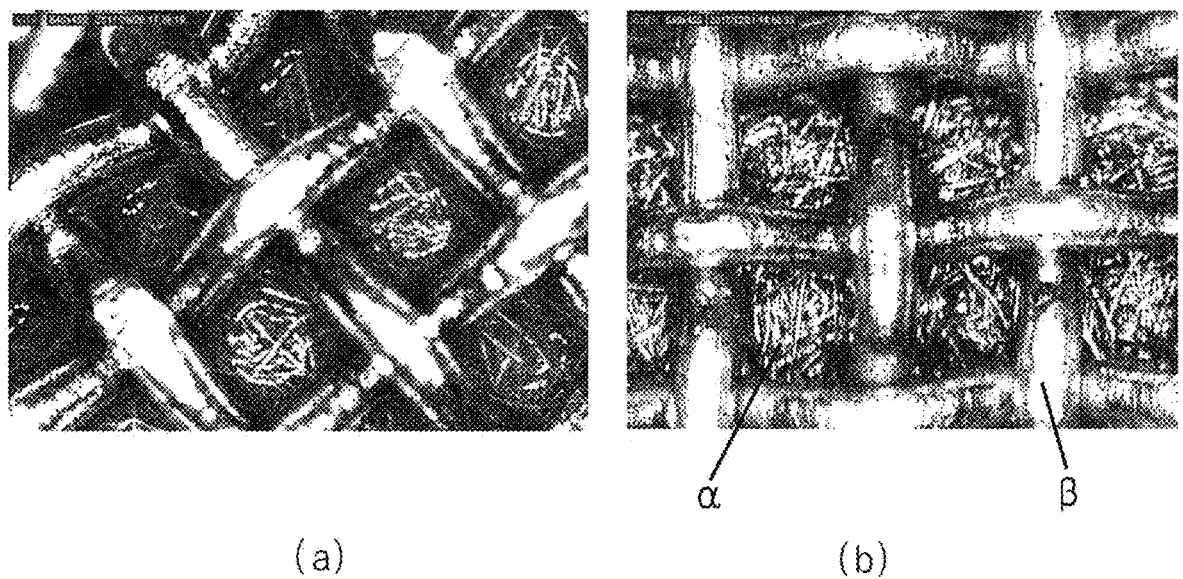
FIG. 5 is a photograph showing each of a surface condition (a) of a metal filter cleaned through an ultrasonic method according to the related art and a surface condition (b) of a metal filter cleaned with an acid cleaning solution through a method according to an embodiment of the present invention.

FIG. 5 is a photograph showing each of a surface condition (a) of the metal filter cleaned through the ultrasonic method of Comparative Example 1 and a surface condition (b) of the metal filter cleaned by an acid cleaning solution through the method according to Embodiment 2 of the present invention. As illustrated, in the ultrasonic method according to the related art, the foreign substances attached to the through-holes of the inner shell (a) remain. On the other hand, in the cleaning method according to the present invention in which the acid cleaning was performed at the pH concentration ranging from 1 to 2 together with spraying of the bubbles, and then, the water cleaning was performed additionally, it may be visually confirmed that further effective cleaning is achieved because the cleaning was performed while dissolving the foreign substances attached chemically and physically.

Experimental Example 2

Comparison of Cleaning States Depending on Cleaning Solutions

Cleaning in which Only Water is Used (Comparative Example 2)

Cleaning and drying of a metal filter were performed by the cleaning method according to Embodiment 2 of the present invention, wherein the cleaning was performed without injection of the cleaning solution. In a state in which the metal filter is immersed in the water, the spaying of bubbles was performed in the same manner. Here, a temperature of the water is 50° C., and pH is in the range from 6.5 to 7.5. A separate rinsing process was omitted, but a cleaning time increased by a rinsing time. A temperature of compressed air applied when dried is 100° C. to 150° C.

Cleaning in which Alkaline Cleaning Solution is Injected

Comparative Example 3

Cleaning, rinsing, and drying of a metal filter were performed by the cleaning method according to Embodiment 2 of the present invention, wherein the cleaning was performed by injecting sodium hydroxide as a cleaning solution instead of the acid cleaning solution. In a state in which the metal filter is immersed in the water, spaying of bubbles was performed in the same manner. Here, a temperature of the water is 50° C., and pH is in the range from 10 to 11. After the cleaning solution was discharged from a cleaning bath, the metal filter was rinsed with water and dried in the same manner as the method described above. A temperature of compressed air applied when dried is 100° C. to 150° C.

Cleaning According to Embodiment 2 of the Present Invention

Bubbles were sprayed in a state in which a metal filter is immersed in a mixed solution in which water and a cleaning solution with a hydrogen chloride (HCl) component are mixed at an appropriate concentration (HCl of 0.05 mole/L to 0.1 mole/L). Here, the metal filter prior to cleaning is in a state in which foreign substances are attached therein, as almost the same degree as in the metal filter used in the ultrasonic cleaning. A temperature of the mixed solution is 50° C., and pH is 1.0 to 2.0. After the cleaning solution was discharged from a cleaning bath, the metal filter was rinsed with water and dried in the same manner as the method described above. Here, a temperature of compressed air applied when dried is 100° C. to 150° C.

Figure 6:
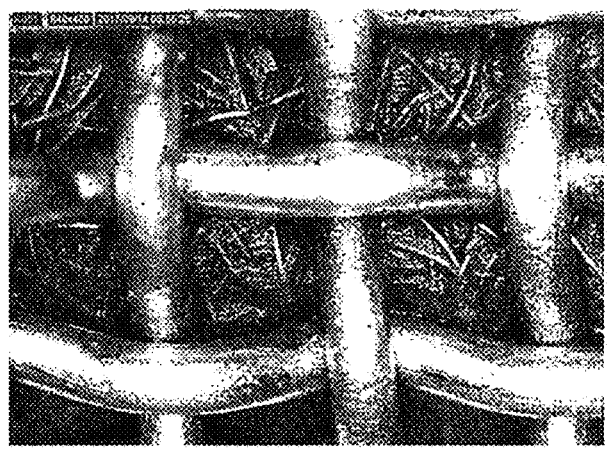
FIG. 6 is a photograph showing each of a surface condition (c) of a metal filter cleaned only with water without using a cleaning solution when the metal filter is cleaned through a cleaning method according to an embodiment of the present invention, a surface condition (d) of a metal filter cleaned by using a sodium hydroxide-based (NaOH) cleaning solution, and the surface condition (b) of the metal filter cleaned with the acid cleaning solution through the method according to the embodiment of the present invention.
Figure 6:
Figure 6:
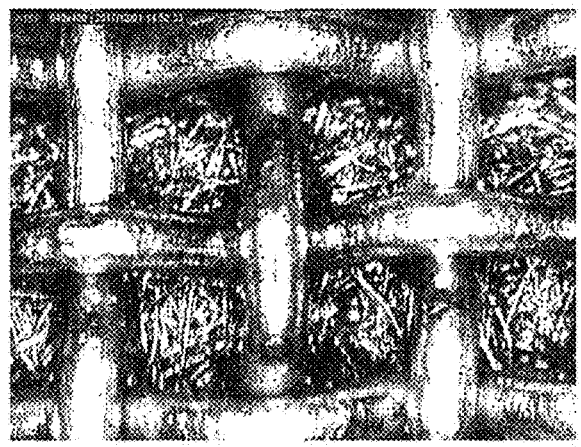

FIG. 6 is a photograph showing each of a surface condition (c) of the metal filter cleaned only with the water without using the cleaning solution in Comparative Example 2, a surface condition (d) of the metal filter cleaned by using the sodium hydroxide-based (NaOH) cleaning solution in Comparative Example 3, and the surface condition (b) of the metal filter cleaned with the acid cleaning solution through the method according to Embodiment 2 of the present invention. In FIG. 6, the cleaning states may be confirmed according to the presence/absence and characteristics of the cleaning solution. As illustrated, it may be confirmed that even the case (d) in which the alkaline cleaning solution is used has more excellent cleaning effect than the case (c) in which only the water is used. However, it may be confirmed that the case (b) in which the acid cleaning solution is used has more excellent cleaning effect into an inner shell while maintaining an original state of the inner shell (maintaining of original surface gloss) than the case (d) in which the alkaline cleaning solution is used.

Test Example 3

Figure 7:
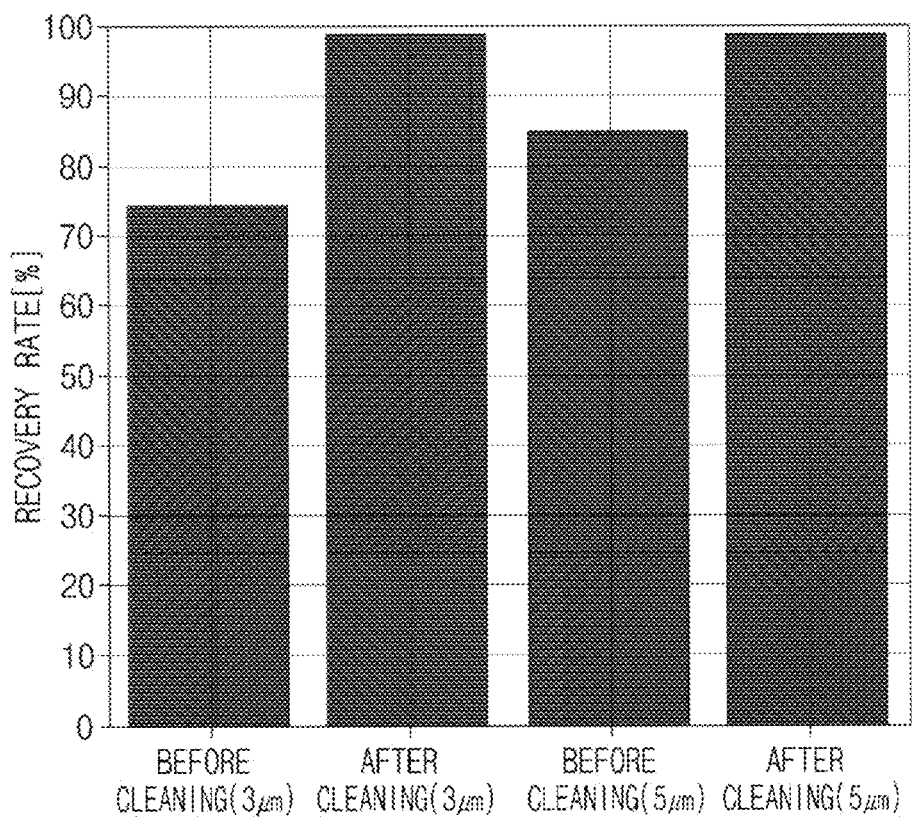
FIG. 7 is a graph showing each of a recovery rate [%: 100−(weight increment/original material weight of metal filter)×100] with respect to before and after the cleaning method according to the present invention; and the weight increment before and after the cleaning method according to the present invention when a size of a through-hole of an inner shell is 3 μm or 5 μm.
Figure 7:
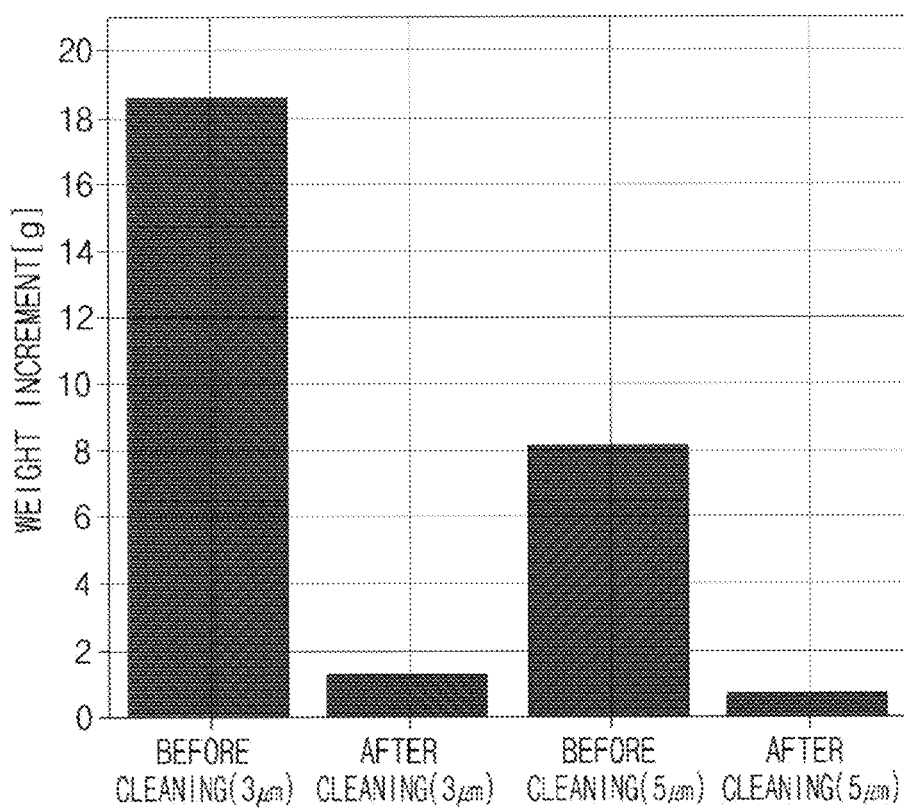

Comparison of Cleaning Efficiencies According to a Through-Hole Size of an Inner Shell FIG. 7 is a graph showing each of a recovery rate [%: 100−(weight increment/original weight of metal filter)] with respect to before and after the cleaning method according to the present invention, and the weight increment before and after the cleaning method according to the present invention when a size of a through-hole of an inner shell is 3 μm or 5 μm.

That is, the recovery rate close to 100% means that the original state maintains even after the cleaning, and a little weight increment after the cleaning means that almost all of the remaining foreign substances attached to the metal filter are washed out to be removed.

Thus, it may be confirmed in FIG. 7, which shows that the inner shell with the through-hole size of 5 μm has a recovery rate closer to 100% and a very little weight increment to exhibit more excellent cleaning efficiency for the metal filter, when compared to that of 3 μm. That is, it may be confirmed that the cleaning efficiency is enhanced when a diameter of the through-hole of the inner shell increases in comparison to when the through-hole is fine.

Test Example 4

Comparison of Cleaning Efficiencies According to a Component of a Cleaning Solution In addition, in Table 1 below, a case in which hydrogen chloride (HCl) is used as the cleaning solution and a case in which sulfuric acid is used are compared to each other.

TABLE 1

| Acid types | Acid concentrations | Classification | Unit | Agitation time | | |
|---|---|---|---|---|---|---|
| | | | | 1 hr | 2 hr | 3 hr |
| HCl | 0.06 M | Solubility | g/g | 0.067 | 0.084 | 0.090 |
| | | Dissolved weight | g | 1.34 | 1.69 | 1.81 |
| H$_2$SO$_4$ | 0.06 M | Solubility | g/g | 0.046 | 0.043 | 0.038 |
| | | Dissolved weight | g | 0.99 | 0.92 | 0.81 |
| | 0.11 M | Solubility | g/g | 0.078 | 0.074 | 0.077 |
| | | Dissolved weight | g | 1.79 | 1.71 | 1.78 |
| | 0.23 M | Solubility | g/g | 0.126 | 0.129 | 0.130 |
| | | Dissolved weight | g | 3.25 | 3.35 | 3.38 |

As shown in Table 1, the results indicate that solubility of hydrogen chloride is slightly higher than that of sulfuric acid under the same acid concentration (0.06M). That is, the hydrogen chloride exhibits a higher effect of dissolving the foreign substances when the same amount is injected, but it is preferable that the sulfuric acid, which is relatively inexpensive, is used as the cleaning solution in consideration of an effect per price because solubility increases in proportion to an increase of the injected amount.

The present invention comprising the above-described constituents has an effect in which an installation space is reduced, and an amount of water to be consumed decreases when compared to the related art, because the water, the cleaning solution, and the compressed air are automatically supplied and discharged according to the predetermined logic to sequentially perform cleaning and drying of the metal filter 1 within the cleaning bath 10.

According to the present invention, since the air nozzle 30 generates bubbles under the water when spraying the compressed air in a state in which the cleaning bath is filled with the water, the cleaning effect may be enhanced due to the bubbles.

Also, since the metal filter 1 is selectively elevated or rotates when cleaned or dried, water and foreign substances may be shaken off by a centrifugal force and/or inertia, and thus, cleaning and drying efficiencies may be further enhanced.

In addition, since the cleaning is performed while the cleaning bath 10 is closed by the cover 21, the water may be prevented from splashing outward. The internal pressure rising as the compressed air is injected may be released by the release valve 11.

Although the present invention is described by specific embodiments and drawings, the present invention is not limited thereto, and various changes and modifications may be made by a person skilled in the art to which the present invention pertains within the technical idea of the present invention and equivalent scope of the appended claims.

The invention claimed is:

1. An apparatus for cleaning a metal filter, the apparatus comprising:
    a cleaning bath having a predetermined size and connected to a cleaning solution tank;
    a jig which is vertically elevatable and horizontally slidable in the cleaning bath, the jig being configured to receive the metal filter fixed thereto;
    a nozzle assembly mounted so that a discharge hole thereof is faced upward in the cleaning bath, the nozzle assembly being configured to spray compressed air or water, which is supplied from the outside, into the cleaning bath; and
    a controller which is configured to control supply and blocking of a cleaning solution from the cleaning solution tank to the cleaning bath, supply and blocking of the compressed air or the water to the nozzle assembly, movement of the jig, and filling or discharging of the water into/from the cleaning bath,
    wherein, when the metal filter is mounted on the jig so that an opening of the metal filter is faced downward, the controller controls the movement of the jig so that the nozzles of the nozzle assembly sequentially enter the metal filter through the opening, and the controller selectively controls the supply and blocking of the water, the cleaning solution, and the compressed air, and the draining of the cleaning bath according to predetermined logic to sequentially perform cleaning and drying of the metal filter within the cleaning bath,
    wherein the nozzle assembly comprises an air nozzle configured to spray the compressed air and, a water nozzle installed spaced apart from the air nozzle and configured to spray the water, and
    wherein the jig is configured to move vertically and horizontally relative to the air nozzle and water nozzle to allow the air nozzle and water nozzle to selectively enter the opening of the metal filter.

2. The apparatus of claim 1, wherein the air nozzle is connected to an air tank in which the compressed air is stored, and the water nozzle is connected to a water tank in which the water is stored, the apparatus further comprising a valve installed between the air nozzle and the air tank and a valve installed between the water nozzle and the water tank, each of the valves being configured to be opened and closed by the controller.

3. The apparatus of claim 1, wherein the air nozzle is configured to generate bubbles under the water when the cleaning bath is filled with the water, the air nozzle being configured to spray the bubbles so that a point at which the bubbles contact an inner surface of the metal filter is higher than a point at which the bubbles are generated by the air nozzle.

4. The apparatus of claim 1, further comprising a gripper that is configured to be coupled to an upper end of the metal filter, the gripper being configured to rotate the metal filter when one of the nozzles enters the metal filter.

5. The apparatus of claim 1, wherein the cleaning bath has an open upper side and is configured to be opened and closed by a cover that is configured to cover the upper side.

6. The apparatus of claim 5, wherein the cleaning bath comprises a release valve that is configured to discharge the compressed air or the water when an internal pressure increases due to a performance of the cleaning when the cleaning bath is closed by the cover.

* * * * *